(12) United States Patent
Regenauer et al.

(10) Patent No.: US 12,337,575 B2
(45) Date of Patent: Jun. 24, 2025

(54) LAMINATED GLAZING COMPRISING A BIRD PROTECTION PATTERN

(71) Applicant: KURARAY EUROPE GMBH, Hattersheim am Main (DE)

(72) Inventors: Jochen Regenauer, Hattersheim am Main (DE); Christoph Troska, Herten (DE)

(73) Assignee: KURARAY EUROPE GMBH, Hattersheim am Main (DE)

( * ) Notice: Subject to any disclaimer, the term of this patent is extended or adjusted under 35 U.S.C. 154(b) by 0 days.

(21) Appl. No.: 18/839,076

(22) PCT Filed: Feb. 6, 2023

(86) PCT No.: PCT/EP2023/052858
§ 371 (c)(1),
(2) Date: Aug. 16, 2024

(87) PCT Pub. No.: WO2023/156239
PCT Pub. Date: Aug. 24, 2023

(65) Prior Publication Data
US 2025/0108585 A1    Apr. 3, 2025

(30) Foreign Application Priority Data
Feb. 18, 2022   (EP) .................... 22157522

(51) Int. Cl.
*B32B 15/04* (2006.01)
*A01M 29/08* (2011.01)
*B32B 17/06* (2006.01)
*B32B 17/10* (2006.01)

(52) U.S. Cl.
CPC ....... *B32B 17/10275* (2013.01); *A01M 29/08* (2013.01); *B32B 17/10036* (2013.01); *B32B 17/1055* (2013.01); *B32B 2250/04* (2013.01); *B32B 2255/10* (2013.01); *B32B 2307/4023* (2013.01); *B32B 2307/41* (2013.01)

(58) Field of Classification Search
CPC ................................. B32B 17/10036
USPC .................................. 428/426, 428
See application file for complete search history.

(56) References Cited

U.S. PATENT DOCUMENTS

| | | | |
|---|---|---|---|
| 3,404,134 A | 10/1968 | Watkin | |
| 4,663,228 A * | 5/1987 | Bolton | B32B 17/10137 156/99 |
| 8,399,097 B2 * | 3/2013 | Bennison | B32B 17/10018 428/441 |
| 10,125,205 B2 * | 11/2018 | Pesek | B32B 17/10743 |
| 10,968,684 B2 * | 4/2021 | Bjergaard | B32B 17/1077 |
| 2015/0158986 A1 * | 6/2015 | Xu | B32B 27/06 428/476.3 |
| 2015/0251384 A1 * | 9/2015 | Bennison | B32B 17/10614 428/428 |
| 2017/0028686 A1 * | 2/2017 | Wilson | B32B 7/05 |
| 2019/0030863 A1 * | 1/2019 | Smith | B32B 27/306 |
| 2020/0031206 A1 * | 1/2020 | Sweney | B60J 1/02 |
| 2020/0251082 A1 * | 8/2020 | Smith | B32B 17/10743 |
| 2020/0262185 A1 * | 8/2020 | Seidler | B32B 3/085 |
| 2021/0308991 A1 * | 10/2021 | Broekhuis | B32B 17/10798 |
| 2021/0362468 A1 * | 11/2021 | Smith | B32B 17/10688 |
| 2022/0333433 A1 * | 10/2022 | Jeanfils | B32B 17/10055 |
| 2023/0271409 A1 * | 8/2023 | Smith | B32B 17/10036 428/441 |

FOREIGN PATENT DOCUMENTS

| | | |
|---|---|---|
| WO | WO-2019027865 A1 | 2/2019 |
| WO | WO-2020173832 A1 | 9/2020 |

OTHER PUBLICATIONS

International Preliminary Report on Patentability and Written Opinion issued Aug. 29, 2024 in PCT/EP2023/052858, 6 pages.
International Search Report and Written Opinion issued Apr. 13, 2023 in PCT/EP2023/052858, 7 pages.

* cited by examiner

*Primary Examiner* — Lauren R Colgan
(74) *Attorney, Agent, or Firm* — Element IP, PLC

(57) ABSTRACT

The invention is directed to laminated glazing comprising two glass sheets laminated by means of at least two interlayers wherein at least one surface of one of the interlayers is provided with a bird protection pattern in between the two interlayers and wherein at least one interlayer comprises an ionomer.

11 Claims, No Drawings

LAMINATED GLAZING COMPRISING A BIRD PROTECTION PATTERN

The invention is directed to laminated glazing comprising two glass sheets laminated by means of at least two interlayers wherein at least one surface of one of the interlayers is provided with a bird protection pattern in between the two interlayers and wherein at least one interlayer comprises an ionomer.

Window strikes represent one of the greatest threats to birds because window glazing is not perceived as a barrier to the bird. Effort has been made to develop bird-safe glazing by transforming window glass into a barrier that birds will see and avoid. Such glass usually has bird protection patterns, i.e. visual markers, across the surface of the glazing to distort the reflections of surrounding elements. Such patterns are generally printed directly onto the surface of one of the glass sheets, e.g. by enamel printing. However, such printing techniques are not very flexible and rather expensive in the production process. Additionally, they can lead to a reduction in the quality of the glass as enamel printing requires high temperatures.

Laminated glazing usually consists of two glass sheets laminated by means of an interlayer film. Such films are often made from plasticiser-containing polyvinyl acetals like polyvinyl butyral (PVB). Partially neutralized ethylene acid copolymers, referred to as "ionomers", have also been used as interlayers for preparing laminated safety glass, for example, as disclosed in U.S. Pat. No. 3,404,134 and WO2019027865A1.

Thus, modification of the surface of the interlayer with a bird-protection pattern and subsequent lamination between two glass sheets would also be a possible solution. However, it has now been found by the present inventors that this approach has various disadvantages. A bird-protection pattern printed or coated onto the surface of the interlayer using an ink can interfere with the glass surface and thus, lead to problems with the adhesion of the interlayer to the glass. This can impede the safety of the laminated glazing.

Additionally, it has been surprisingly found that the optical quality, especially in terms of a sharp boarder of the individual objects making up the bird protection pattern, is reduced when the patterns is in direct contact to the glass surface. This decrease in optical quality will inevitably lead to a lower economic value of the windows produced.

The problem addressed by the present invention was therefore to provide a laminated glass comprising a bird protection pattern with improved stability, improved optical quality, improved duration and/or improved processibility. These and other problems have been solved by the present invention.

Accordingly, a first aspect of the present invention concerns a laminated glazing for reducing or preventing bird collision comprising at least two glass sheets and at least a first and a second interlayer, characterized in that at least one surface of the first interlayer is provided with a bird protection pattern facing the second interlayer and wherein the first interlayer comprises an ionomer. Preferably, the bird protection pattern is printed or coated onto the at least one surface of the first interlayer.

In other words, the bird-protection pattern is sandwiched between the first and the second interlayer and thus, the pattern is not in direct contact with a glass surface of one of the two glass sheets. This feature highly improves the adhesion of the interlayer to the glass sheets and thus, ensures the safety of the laminated glazing. Furthermore, the optical quality of the individual features of the pattern is highly improved. Additionally, fading or deterioration of the pattern from an exposure to sunlight can be reduced by using a UV-blocking agents present in the two interlayer films on both sides of the pattern.

Also preferably, the bird protection pattern has a transparency for light in the range from 380 to 750 nm of less than 5%. In this embodiment, the bird protection pattern can have any colour. However, it is preferably black or grey.

Alternatively, the bird protection pattern has a transparency for light in the range from 380 to 750 nm of more than 50% and comprises a UV absorber or a UV reflective agent.

Unlike humans, many birds are tetrachromatic and can see light in the UV range. Thus, the bird protection pattern can also be present on the first interlayer by means of a UV absorbing or UV reflecting agent. These patterns can then be seen by the birds but are being conceived as clear to the human eye.

Examples of suitable UV reflecting agents are tin or titanium oxide. They may be deposited onto the surface of the first interlayer by any conventional thin film deposition, coating or printing technique.

Examples of suitable UV absorbers include benzotriazole-based compounds, benzophenone-based compounds, triazine-based compounds, benzoate-based compounds, malonic ester-based compounds, or oxalic anilide-based compounds.

More preferably, the UV absorber is a benzotriazole-based UV absorber such as 2-(5-methyl-2-hydroxyphenyl)benzotriazole, 2-[2-hydroxy-3,5-bis($\alpha,\omega$-dimethylbenzyl)phenyl]-2H-benzotriazole, 2-(3,5-di-t-butyl-2-hydroxyphenyl)benzotriazole, 2-(5-chloro-2-benzotriazolyl)-6-tert-butyl-p-cresol, 2-(3-t-butyl-5-methyl-2-hydroxyphenyl)-5-chlorobenzotriazole, 2-(3,5-di-t-butyl-5-methyl-2-hydroxyphenyl)-5-chlorobenzotriazole, 2-(3,5-di-t-amyl-2-hydroxyphenyl)benzotriazole, and 2-(2'-hydroxy-5'-t-octylphenyl)benzotriazole; or a hindered amine-based UV absorber such as 2,2,6,6-tetramethyl-4-piperidylbenzoate, bis(2,2,6,6-tetramethyl-4-piperidyl)sebacate, bis(1,2,2,6,6-pentamethyl-4-piperidyl)-2-(3,5-di-t-butyl-4-hydroxybenzyl)-2-n-butylmalonate, and 4-(3-(3,5-di-t-butyl-4-hydroxyphenyl)propionyloxy)-1-(2-(3-(3,5-di-t-butyl-4-hydroxyphenyl)propionyloxy) ethyl)-2, 2, 6, 6-tetramethylpiperidine; or a benzoate-based UV absorber such as 2, 4-di-t-butylphenyl-3,5-di-t-butyl-4-hydroxybenzoate, and hexadecyl-3,5-di-t-butyl-4-hydroxybenzoate. Most preferably, the UV absorber has a hydroxyphenyl benzotriazole structural unit. Especially preferred is 2-(2H-benzotriazol-2-yl)-4,6-bis(1-methyl-1-phenylethyl)phenol.

Also preferred is 1,2,3,4-butanetetracarboxylic acid, 1,2,3,4-tetrakis(2,2,6,6-tetramethyl-4-piperidinyl) ester (64022-61-3) or butanedioic acid, 1, 4-dimethyl ester, polymer with 4-hydroxy-2,2,6,6-tetramethyl-1-piperidineethanol (65447-77-0).

The transparency for light in the range from 380 to 750 nm is measured according to JIS R 3106.

The bird protection pattern can have any shape or motif. Preferably, the bird protection pattern comprises a plurality of separate elements such as dots, lines or grids. More preferably, the separate elements have a main dimension of 1 mm to 10 mm. Most preferably, the bird protection pattern is a dot pattern.

Surprisingly, it has also been found that laminated glazing with a low yellowness index db of the laminated glazing in the areas not comprising the bird protection pattern, i.e. in the areas where no coating or printing is present and the laminated glazing appears transparent, give especially advantageous results in terms of bird deterrence. It is believed that these highly clear areas increase the contrast to the printed/coated areas on the first interlayer and thus, the latter can more easily be detected by the birds. Accordingly, a preferred embodiment of the invention concerns a laminated glazing wherein the yellowness index db of the laminated glazing in the areas not comprising the bird protection pattern is less than 3, preferably less than 2.5, more preferably less than 2.

The yellowness is determined by the transmission of the film according to EN 410 at 430 nm on a ColorQuest XE in the Hunterlab 2°/C. setting.

Preferably, the thickness of the first and the second interlayer is independently 450-2500 µm, more preferably 600-1000 µm, and most preferably 700-900 µm.

Alternatively, one of the interlayers can have a much lower thickness if the other one has a thickness as described hereabove. In this embodiment, the thinner interlayer is less than 100 µm, preferably 10-100 µm, more preferably 15-75 µm, most preferably 20-50 µm and specifically around 25 µm.

Preferably, both the first and the second interlayers contains an ionomer.

The term "ionomer" as used herein generally refers to a polymer that comprises ionic groups that are carboxylate salts, for example, ammonium carboxylates, alkali metal carboxylates, alkaline earth carboxylates, transition metal carboxylates and/or combinations of such carboxylates. Such polymers are generally produced by partially or fully neutralizing the carboxylic acid groups of precursor or parent polymers that are acid copolymers, as defined herein, for example by reaction with a base. The alkali metal ionomer as used herein is a sodium ionomer, for example a copolymer of ethylene and methacrylic acid, wherein all or a portion of the carboxylic acid groups of the copolymerized methacrylic acid units are neutralized, and substantially all of the neutralized carboxylic acid groups are in the form of sodium carboxylates.

In the ethylene-α,β-unsaturated carboxylic acid copolymer serving as a base polymer, a content proportion of the constituent units derived from an α,β-unsaturated carboxylic acid is typically 2% by mass or more, or 5% by mass or more (based on total copolymer mass). In addition, the content proportion of the constituent units derived from an α,β-unsaturated carboxylic acid is typically 30% by mass or less (based on total copolymer mass).

Examples of the α,β-unsaturated carboxylic acid constituting the ionomer include, without limitation, acrylic acid, methacrylic acid, itaconic acid, maleic acid, fumaric acid, and mixtures of two or more thereof. In one embodiment, the α,β-ethylenically unsaturated carboxylic acid is selected from acrylic acid, methacrylic acid, and mixtures thereof. In another embodiment, the α,β-ethylenically unsaturated carboxylic acid is methacrylic acid.

To obtain the ionomers, the ethylene acid copolymers are partially neutralized by reaction with one or more bases. An example of a suitable procedure for neutralizing the ethylene acid copolymers is described in U.S. Pat. Nos. 3,404,134 and 6,518,365. After neutralization, about 1%, or about 10%, or about 15%, or about 20%, to about 90%, or to about 60%, or to about 55%), or to about 30%>, of the hydrogen atoms of carboxylic acid groups present in the ethylene acid copolymer are replaced by cations.

Preferably, the ionomers according to the present invention are sodium-neutralized ethylene-α,β-unsaturated carboxylic acid copolymers.

In addition, the films may contain further additives, such as residual quantities of water, plasticizers, antioxidants, adhesion promotors or regulators, optical brighteners or fluorescent additives, stabilisers, colorants, processing aids, organic nanoparticles, pyrogenic silicic acid and/or surface active substances. In particular, the films may comprise 0.001 to 0.1% by weight of alkaline salts and/or alkaline earth salts of carboxylic acids as adhesion regulators.

However preferably, the interlayers do not contain any plasticizer.

Preferred adhesion promotors are silanes. Silanes suitable for use in accordance with the present invention are dialkoxysilanes. In one embodiment, each of the alkoxy groups individually contains from 1 to 3 carbon atoms. Suitable examples include diethoxydimethylsilane, diethoxyl(methyl)vinylsilane, 1,3-diethoxy-1, 1, 3, 3-tertramethyldisiloxane, dimethoxydimethylsilane, dimethoxylmethylvinylsilane, methyl diethoxy diisopropyldimethoxysilane, silane, dicyclopentyldimethoxy silane, γ-aminopropyl-N-cyclohexylmethyldimethoxy silane, 3-aminopropylmethyldimethoxysilane, N-phenyI-3-aminopropylmethyldimethoxysilane, N-phenyl-3-aminopropylmethyldietiboxysiIane, N-P-(aminoethyl)-y-aminopropylmethyldimethoxy silane and 3-glycidoxypropylmethyldiethoxy silane.

The films may further contain one or more of the UV absorbers described above in the bulk of the material in addition to or instead of the UV absorber used for forming the bird protection pattern on the surface of the interlayer.

The laminated glazing of the invention can be used for a variety of architectural applications, including windows, structural architectural panels in buildings or stadiums, decorative architectural panels, indoor or outdoor stairs or platforms, pavement or sidewalk skylights, balustrades, curtain walls, flooring, balconies, support columns, skylights and privacy screens.

In a second aspect, the present invention concerns a glass window comprising the laminated glazing according to the present invention and further comprising a third glass sheet separated by air from the first glass sheet or the second glass sheet. Such glass windows are generally used for improved thermal and/or noise insulation purposes.

The present invention also relates to a method for producing the glass laminates described above.

The first and the second interlayer can be any conventional ionomer sheet, e.g. the Trosifol® SentryGlas® range of products commercially available from Kuraray Europe GmbH, e.g. in a thickness of 0.76 mm.

The bird protection pattern can be coated or printed onto at least one surface of the first interlayer. The printed or coated layer usually contains an inorganic or organic pigment, which should not dissolve in the polymer matrix.

Suitable pigments include carbon black, iron oxides, polyaniline, perylenes or spinel pigments are used. The pigments may be dispersed in a carrier fluid like water, alcohol or mixtures of alcohol and water. Furthermore, binders like polyvinyl alcohol, polyvinyl butyral, polyvinylpyrrolidone, polyacrylates, polyurethanes or poly styrene-acrylate may be present. Such printing compositions are referred to as "printing inks" or simple "inks" hereinafter.

Water-based printing inks are preferred over printing inks based on organic solvents since they do not swell or dissolve the interlayers and/or lead to interlayer defects.

The printing inks can be applied via techniques that are commonly known in the printing industry such as offset printing, rotogravure printing, flexography, and screen-printing, followed usually by a drying step.

The dry-film thickness of the printed parts is 1-50 µm depending on the printing technique and the opacity required. Usually, the dry-film thickness is 10-30 µm. The total dry-film thicknesses can be achieved by overlaying several ink-layers from sequential steps of printing or coating.

Subsequently, the laminated glazing can be prepared by combining the first and the second interlayer such that the bird protection pattern is in touch with a main surface of the second interlayer followed by lamination of the thus prepared interlayer stack between two glass sheets.

Vacuum laminators can be used. These consist of a chamber that can be heated and evacuated, in which laminated glazing can be laminated within 30-60 minutes. Reduced pressures from 0.01 to 300 mbar and temperatures from 100 to 200° C., in particular 130-160° C., have proven their worth in practice.

The invention claimed is:

1. A laminated glazing for reducing or preventing bird collision, the laminated glazing comprising:
 a first glass sheet, a second glass sheet, a first interlayer, and a second interlayer, wherein
 at least one surface of the first interlayer is provided with a bird protection pattern facing the second interlayer,
 the first interlayer comprises an ionomer, and
 a yellowness index db of the laminated glazing in areas not comprising the bird protection pattern is less than 2 as determined by transmission of the laminated glazing according to EN 410 at 430 nm on a ColorQuest XE in the Hunterlab 2°/C setting.

2. The laminated glazing according to claim 1 wherein the bird protection pattern is printed or coated onto the at least one surface of the first interlayer.

3. The laminated glazing according to claim 1, wherein the bird protection pattern has a transparency for light ranging from 380 to 750 nm of less than 5% measured according to JIS R 3106.

4. The laminated glazing according to claim 1, wherein the laminated glazing in the areas not comprising the bird protection pattern has a transparency for light ranging from 380 to 750 nm of more than 50% measured according to JIS R 3106 and comprises a UV absorber or a UV reflection agent.

5. The laminated glazing according to claim 1, wherein the ionomer is a sodium-neutralized ethylene-$\alpha,\beta$-unsaturated carboxylic acid copolymer.

6. The laminated glazing according to claim 1, wherein the bird protection pattern is a dot pattern.

7. The laminated glazing according to claim 1, wherein the first interlayer comprises a dialkoxysilane.

8. The laminated glazing according to claim 1, wherein the second interlayer comprises an ionomer.

9. The laminated glazing according to claim 8, wherein the ionomer contained in the first interlayer and the second interlayer is a sodium-neutralized ethylene-$\alpha,\beta$-unsaturated carboxylic acid copolymer.

10. The laminated glazing according to claim 1, wherein at least one of the first interlayer and the second interlayer comprises no plasticizer.

11. A glass window, comprising:
 the laminated glazing according to claim 1, and
 a third glass sheet separated by air from the first glass sheet or the second glass sheet.

* * * * *